US012585455B2

(12) United States Patent
Ishikawa

(10) Patent No.: US 12,585,455 B2
(45) Date of Patent: *Mar. 24, 2026

(54) SERVER, NON-TRANSITORY STORAGE MEDIUM, AND SOFTWARE UPDATE METHOD

(71) Applicant: TOYOTA JIDOSHA KABUSHIKI KAISHA, Toyota (JP)

(72) Inventor: Tomoyasu Ishikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 116 days.

This patent is subject to a terminal disclaimer.

(21) Appl. No.: 18/344,932

(22) Filed: Jun. 30, 2023

(65) Prior Publication Data

US 2024/0069898 A1 Feb. 29, 2024

(30) Foreign Application Priority Data

Aug. 30, 2022 (JP) ................................. 2022-136857

(51) Int. Cl.
*G06F 8/65* (2018.01)
*B60W 50/14* (2020.01)

(52) U.S. Cl.
CPC .............. *G06F 8/65* (2013.01); *B60W 50/14* (2013.01); *B60W 2050/146* (2013.01)

(58) Field of Classification Search
CPC ......... G06F 8/65; H04L 41/082; H04L 67/12; H04W 4/40; H04W 8/245; B60W 2050/0083; B60W 2050/146
See application file for complete search history.

(56) References Cited

U.S. PATENT DOCUMENTS

| | | | |
|---|---|---|---|
| 11,934,823 B2 | 3/2024 | Harata et al. | |
| 2012/0144347 A1* | 6/2012 | Jo | G06F 3/04817 345/173 |
| 2012/0167071 A1* | 6/2012 | Paek | G06F 8/65 717/170 |
| 2013/0046893 A1* | 2/2013 | Hauser | G06F 9/4856 709/226 |

(Continued)

FOREIGN PATENT DOCUMENTS

| | | |
|---|---|---|
| JP | 2001099666 A | 4/2001 |
| JP | 2002009896 A | 1/2002 |

(Continued)

OTHER PUBLICATIONS

Office Action issued to U.S. Appl. No. 18/351,590 on Mar. 31, 2025.

*Primary Examiner* — Marina Lee
(74) *Attorney, Agent, or Firm* — Dickinson Wright, PLLC

(57) ABSTRACT

A server is configured to send data for updating software on a vehicle control device through wireless communication. The server includes: a memory storing a program; and a processor configured to execute the program, the processor being configured to set first data and second data, the first data being data to be displayed on an in-vehicle display in order to obtain user's approval to the software update, the second data being data to be displayed on user equipment in order to obtain the user's approval to the software update, and the first data having higher information granularity than the second data.

8 Claims, 9 Drawing Sheets

(56)             References Cited

U.S. PATENT DOCUMENTS

2014/0325500 A1 * 10/2014 Jang ......................... G06F 8/65
                                                                717/173
2016/0127529 A1 *  5/2016 Kim ....................... H04L 67/12
                                                                455/418
2019/0230401 A1 *  7/2019 Chamberlain ... H04N 21/41422
2020/0142661 A1    5/2020 Cansino et al.
2022/0253301 A1    8/2022 Harata et al.
2022/0410754 A1   12/2022 Sakurai et al.
2023/0033167 A1 *  2/2023 Sakurai ..................... G06F 8/65
2023/0048368 A1 *  2/2023 Pirwani .............. B60R 16/0232
2024/0069899 A1 *  2/2024 Ishikawa ................... G06F 8/65

FOREIGN PATENT DOCUMENTS

JP      2002181582 A      6/2002
JP      2006128886 A      5/2006
JP      2017149323 A      8/2017
JP      2020176974 A     10/2020
JP      2022027828 A      2/2022
KR        101185384 B1    9/2012
KR      20160051399 A      5/2016
WO      2021/177224 A1     9/2021

* cited by examiner

FIG. 8

SERVER, NON-TRANSITORY STORAGE MEDIUM, AND SOFTWARE UPDATE METHOD

CROSS-REFERENCE TO RELATED APPLICATION

This application claims priority to Japanese Patent Application No. 2022-136857 filed on Aug. 30, 2022, incorporated herein by reference in its entirety.

BACKGROUND

1. Technical Field

The present disclosure relates to servers, non-transitory storage media, and software update methods.

2. Description of Related Art

Over-the-Air (OTA) technology for updating software (vehicle control programs) stored in a vehicle control device (electronic control unit (ECU)) through wireless communication has been studied and developed. For example, Japanese Unexamined Patent Application Publication No. 2017-149323 (JP 2017-149323 A) discloses a vehicle control system capable of safely updating software without impairing user convenience. When it is determined that an electronic key of a vehicle is located inside the vehicle, a mobile device sends a signal requesting a download of update software to a server. An ECU downloads, via the mobile device, the update software sent from the server and updates the software.

SUMMARY

Software updates on electrical devices such as personal computers and smartphones typically require user's approval. It is conceivable to obtain user's approval in advance when updating software on ECUs as well.

Software updates on electrical devices are mainly performed at user's home. On the other hand, software updates on ECUs are performed sometimes at user's home, and sometimes wherever the user is outside his or her home. It is desirable to appropriately provide the user with data for obtaining his or her approval without impairing user convenience, regardless of the situation he or she is in when updating software.

The present disclosure provides a technique of improving user convenience in software updates on ECUs.

A server according to a first aspect of the present disclosure sends data for updating software on a vehicle control device through wireless communication. The server includes a memory storing a program, and a processor configured to execute the program. The processor is configured to set first data and second data, the first data being data to be displayed on an in-vehicle display in order to obtain user's approval to the software update, and the second data being data to be displayed on user equipment in order to obtain the user's approval to the software update. The first data has higher information granularity than the second data.

A non-transitory storage medium according to a second aspect of the present disclosure stores instructions that are executable by a computer and that cause the computer to perform functions in order to update software on a vehicle control device through wireless communication. The functions include: setting first data and second data, the first data being data to be displayed on an in-vehicle display in order to obtain user's approval to the software update, and the second data being data to be displayed on user equipment in order to obtain the user's approval to the software update; and causing either or both of the in-vehicle display and the user equipment to display corresponding data out of the first data and the second data. The first data has higher information granularity than the second data.

A software update method according to a third aspect of the present disclosure is a method for updating software on a vehicle control device through wireless communication. The software update method includes: setting first data and second data, the first data being data to be displayed on an in-vehicle display in order to obtain user's approval to the software update, and the second data being data to be displayed on user equipment in order to obtain the user's approval to the software update; and causing either or both of the in-vehicle display and the user equipment to display corresponding data out of the first data and the second data. The first data has higher information granularity than the second data.

According to the present disclosure, user convenience can be improved in software updates on ECUs.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a flowchart showing a second example of the process of obtaining the user's approval to a software update;

DETAILED DESCRIPTION OF EMBODIMENTS

Embodiment

System Configuration

Figure 1:
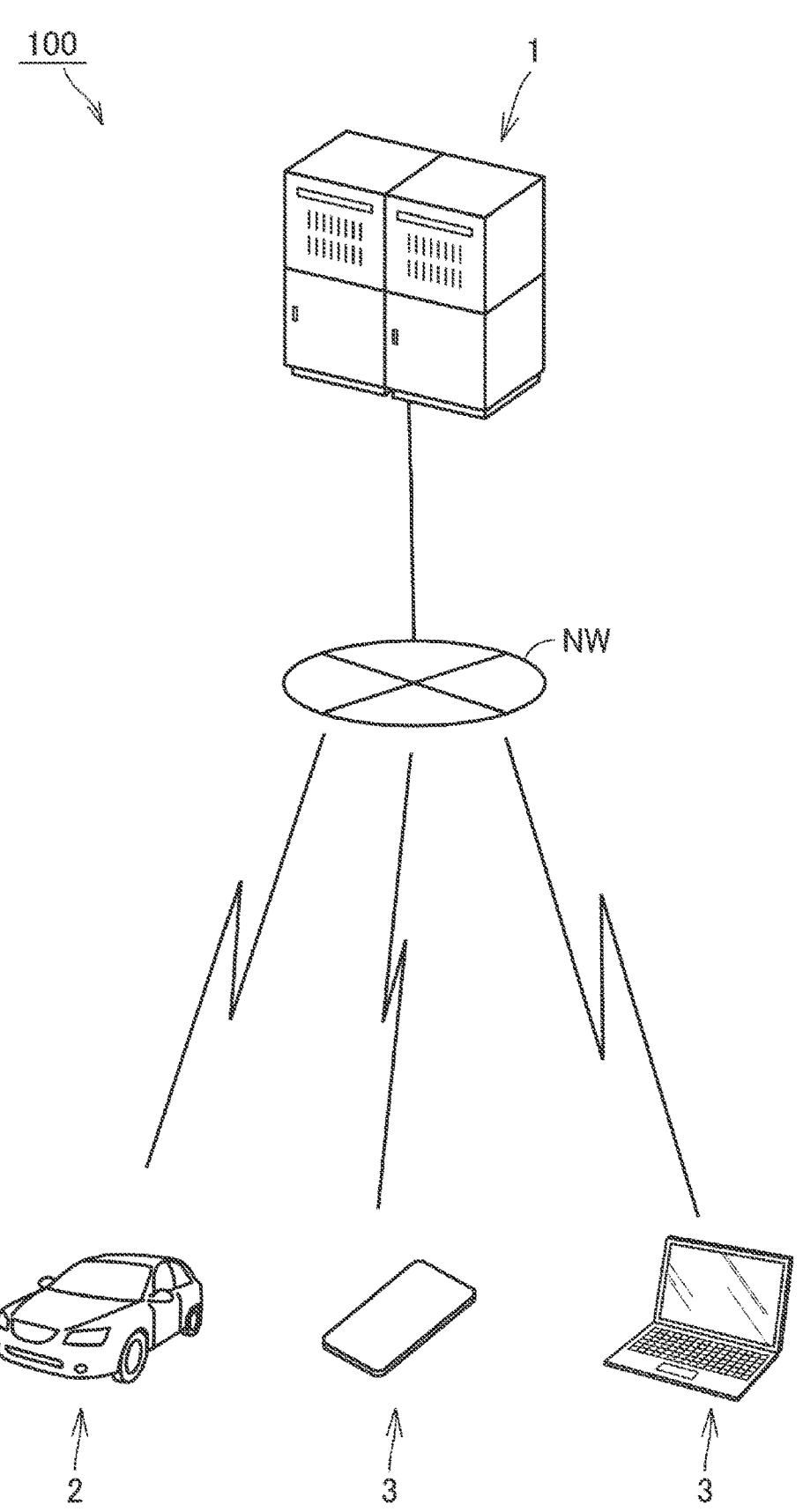
FIG. 1 shows a schematic configuration of an information processing system according to an embodiment of the present disclosure.

FIG. 1 shows a schematic configuration of an information processing system according to an embodiment of the present disclosure. An information processing system 100 includes an OTA center 1, a vehicle 2, and user equipment 3. The OTA center 1 is connected to the vehicle 2 and the user equipment 3 via a wired or wireless network NW so that the OTA center 1 can communicate with the vehicle 2 and the user equipment 3.

The OTA center 1 is a server that provides software for ECUs (see FIG. 3) mounted on the vehicle 2. The OTA center 1 is managed by, for example, a vehicle manufacturer that manufactures a vehicle platform (VP). The configuration of the OTA center 1 will be described later with reference to FIG. 2.

The vehicle 2 is managed by a user. The user is typically an individual, but may be, for example, a cooperate body that conducts business using the vehicle 2 (a transport operator etc.). In the present embodiment, the vehicle 2 is an autonomous vehicle. In this case, the OTA center 1 may be managed by a manufacturer of an autonomous driving system (ADS) (see FIG. 3) mounted on the VP, instead of or in addition to the vehicle manufacturer. The vehicle 2 may be a vehicle that can only be manually driven and that does not support autonomous driving. The configuration of the vehicle 2 will be described later with reference to FIG. 3.

The user equipment 3 is equipment that is operated by the user of the vehicle 2. The user equipment 3 may be mobile equipment or stationary equipment. Examples of the mobile equipment include smartphones, tablets, notebook personal computers (PCs), and wearable devices (smartwatches etc.). Examples of the stationary equipment include desktop PCs. The configuration of the user equipment 3 will be described later with reference to FIG. 4.

Although only one vehicle 2 is shown in FIG. 1 due to space limitations, the information processing system 100 may include any number of vehicles 2. The information processing system 100 typically includes a large number of vehicles 2. The same applies to the user equipment 3.

Figure 2:
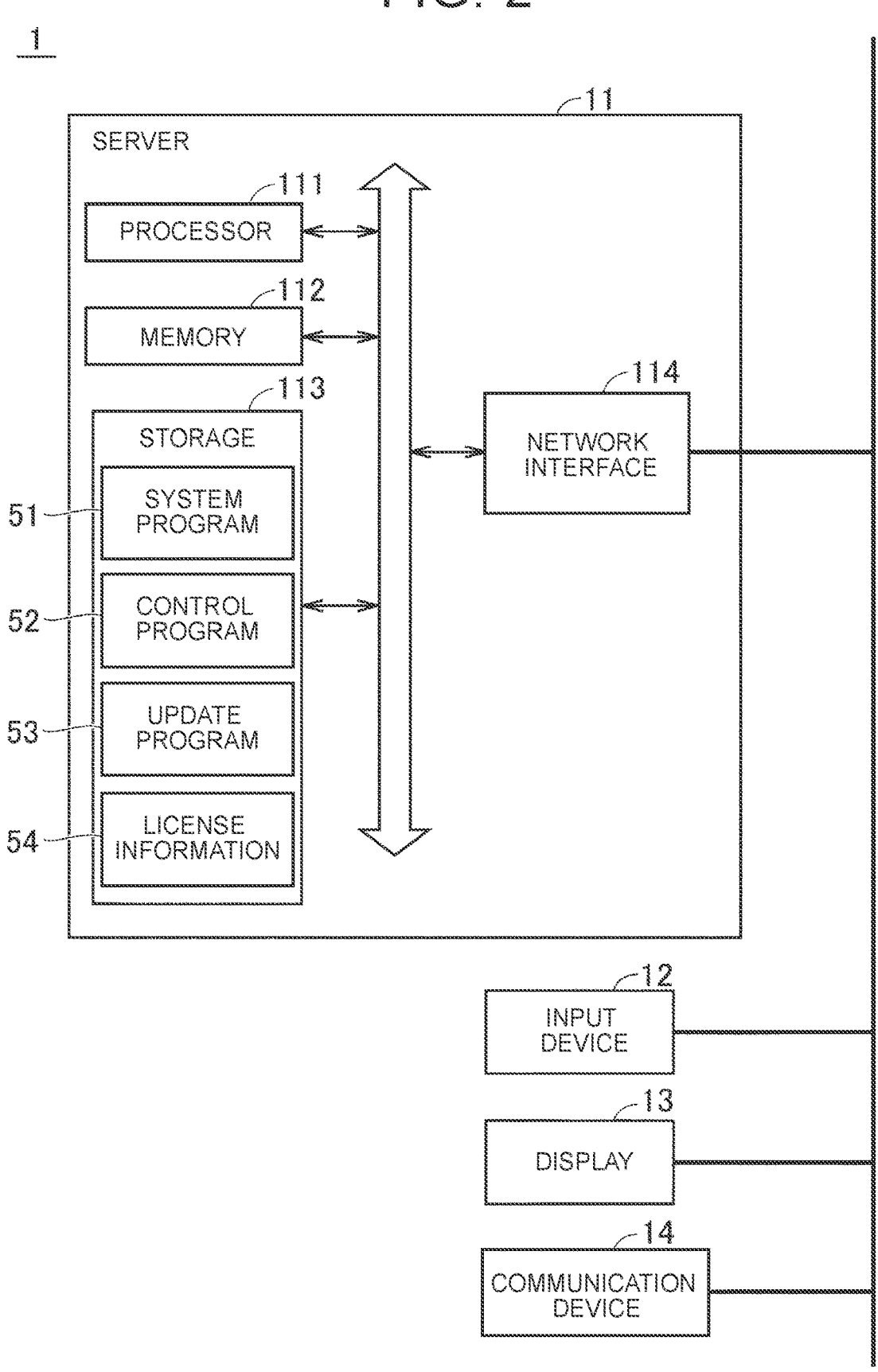
FIG. 2 is a block diagram showing a typical configuration example of an OTA center.

FIG. 2 is a block diagram showing a typical configuration example of the OTA center 1. The OTA center 1 includes a server 11, an input device 12, a display 13, and a communication device 14. The server 11 includes a processor 111, a memory 112, a storage 113, and a network interface 114. The components of the OTA center 1 are connected to each other via a communication bus.

The storage 113 is a rewritable nonvolatile memory such as a hard disk drive (HDD), a solid state drive (SSD), or a flash memory. The storage 113 stores: a system program 51 including an operating system (OS); a control program 52 including computer-readable codes necessary for control calculations; an update program 53 for updating control programs for the vehicle 2; and license information 54 (will be described later) for obtaining user's approval regarding a download, installation, etc. of the update program 53. The processor 111 is, for example, a central processing unit (CPU) or a micro-processing unit (MPU). The processor 111 reads the system program 51 and the control program 52, loads them into the memory 112, and executes them to implement various processes. The network interface 114 controls data communication that is performed between the server 11 and other devices (vehicle 2, user equipment 3, etc.) via the communication device 14.

The input device 12 is a keyboard, a mouse, etc. and receives input from an operator of the server 11. The display 13 displays various kinds of information to the operator of the server 11.

Although FIG. 2 shows an example in which the server 11 includes one processor 111, the server 11 may include a plurality of processors. That is, the server 11 includes one or more processors. The same applies to the memory 112 and the storage 113.

As used herein, the "processor" is not limited to a processor in a narrow sense that performs processes in a stored-program mode, and may include hardwired circuits such as application specific integrated circuits (ASICs) and field-programmable gate arrays (FPGAs). Therefore, the term "processor" may be read as processing circuitry whose processes are defined in advance by computer-readable codes and/or hardwired circuits.

Figure 3:
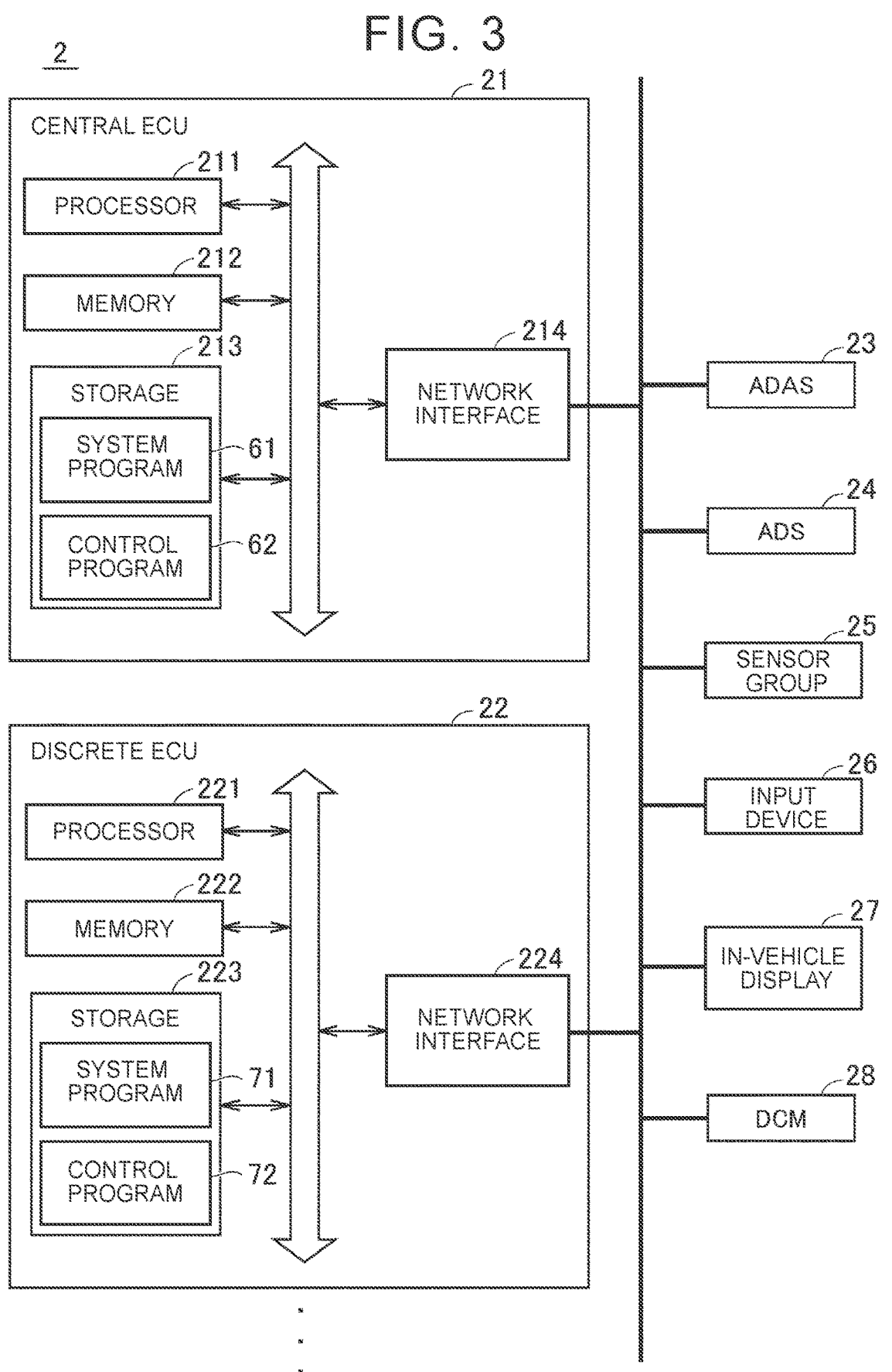
FIG. 3 is a block diagram showing a typical configuration example of a vehicle.

FIG. 3 is a block diagram showing a typical configuration example of the vehicle 2. The vehicle 2 includes a central ECU 21, a plurality of discrete ECUs 22, an advanced driver-assistance system (ADAS) 23, an ADS 24, a sensor group 25, an input device 26, an in-vehicle display 27, and a Data Communication Module (DCM) 28. The discrete ECUs 22 are separate ECUs for each feature, and include, for example, a brake ECU, a steering ECU, a motor generator ECU, and a body ECU. The discrete ECUs 22 may be controllers storing software for implementing features of the ADAS 23 and/or the ADS 24. The components of the vehicle 2 are connected to each other via a wired in-vehicle network such as a controller area network (CAN) or in-vehicle Ethernet (registered trademark).

The basic configurations of the central ECU 21 and the discrete ECUs 22 are similar to the configuration of the server 11. A storage 223 of each discrete ECU 22 stores software (system program 71 and control program 72) that is executed by a processor 221 of the discrete ECU 22. Each discrete ECU 22 controls a system corresponding to the discrete ECU 22 so that the vehicle 2 goes into a desired state according to signals from the sensor group 25 etc. As used herein, the system may include a braking system, a steering system, a powertrain system, a body system, etc., none of which are shown.

A processor 211 of the central ECU 21 controls an update process of software stored in the storages 223 of the discrete ECUs 22. The central ECU 21 receives (downloads) software from the OTA center 1 via the DCM 28, and stores (installs) the downloaded software in the storage 223 of the discrete ECU 22 at an appropriate timing. The central ECU 21 then activates the installed software at an appropriate timing.

The ADAS 23 includes, for example, Adaptive Cruise Control (ACC), Auto Speed Limiter (ASL), Lane Keeping Assist (LKA), Pre-Crash Safety (PCS), and Lane Departure Alert (LDA). The ADS 24 is configured to perform autonomous driving of the vehicle 2.

The sensor group 25 includes sensors configured to detect the surroundings of the vehicle 2. The sensor group 25 further includes sensors configured to detect information according to the driving state of the vehicle 2 and detect a steering operation, an accelerator operation, and a brake operation (none of such sensors are shown). Specifically, the sensor group 25 may include, for example, a camera, a radar, a Laser Imaging Detection and Ranging (LIDAR), a vehicle speed sensor, an acceleration sensor, a yaw rate sensor, and a steering sensor (none of which are shown).

The input device 26 is, for example, a touch panel provided on a multi-information display (MID). The input device 26 may be a physical switch or button. The in-vehicle display 27 is, for example, an MID. The in-vehicle display 27 may be an instrument panel to which display technology such as liquid crystal display technology or organic electroluminescence (EL) display technology is applied. The DCM 28 is an in-vehicle communication module. The DCM 28 is configured to allow two-way data communication between the central ECU 21 and the server 11.

Figure 4:
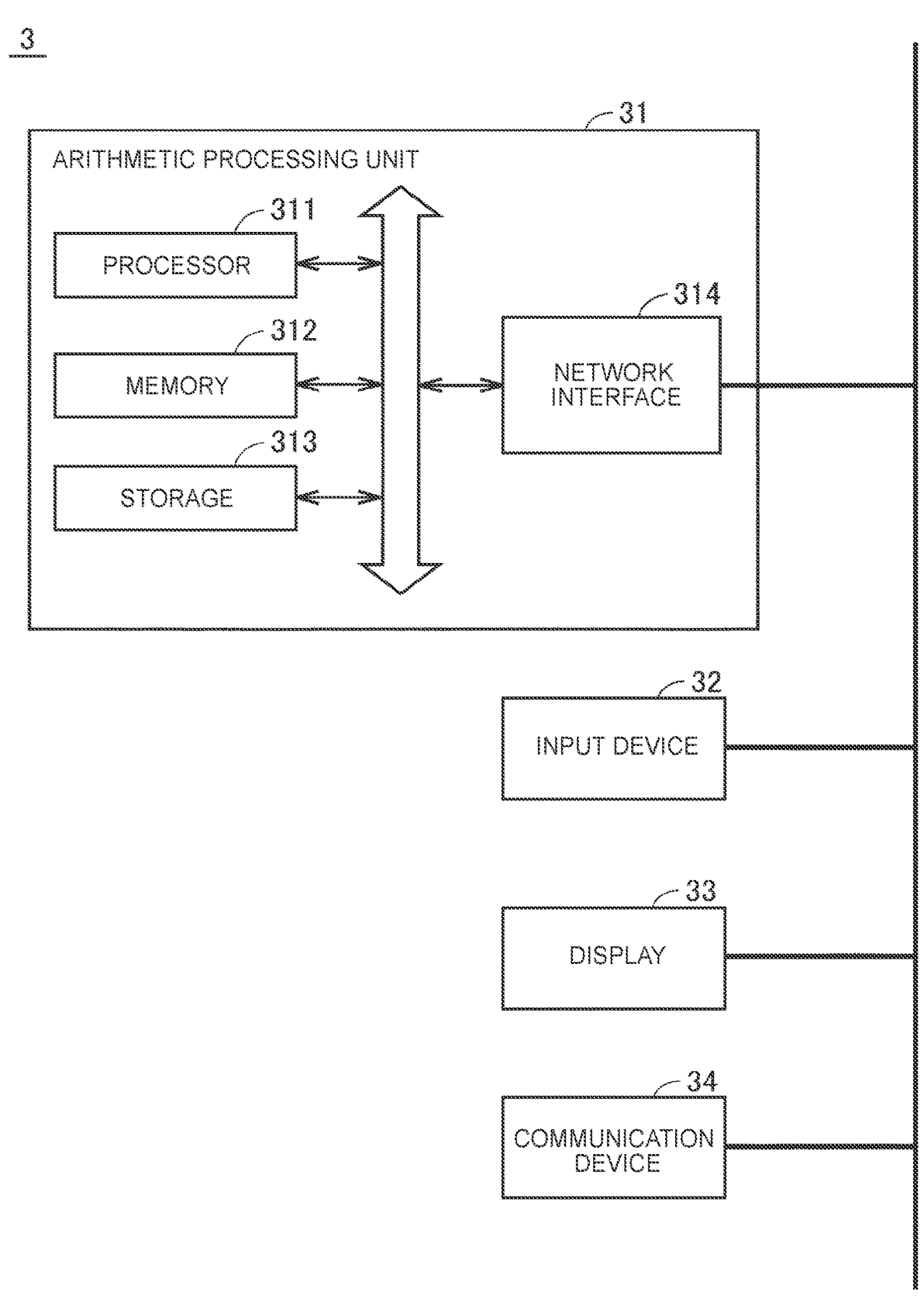
FIG. 4 is a block diagram showing a typical configuration example of user equipment.

FIG. 4 is a block diagram showing a typical configuration example of the user equipment 3. The user equipment 3 includes an arithmetic processing unit 31, an input device 32, a display 33, and a communication device 34. The input device 32 and the display 33 are configured as an integrated unit such as a touch panel display. However, the input device 32 may be a dedicated input device (keyboard, mouse, etc.), and the display 33 may be a stationary monitor. Other configurations of the user equipment 3 are similar to those of the server 11 (see FIG. 2).

User License

Software updates on the discrete ECUs 22 are performed sometimes at the user's home, and sometimes wherever the user is outside his or her home. In the present embodiment, information for obtaining the user's approval is presented to the user before a software update on the discrete ECU 22 is performed. This information is hereinafter referred to as "license information." The license information includes, but is not limited to, information on a software license agreement. The license information may include information explaining the content of the software update, or may include information explaining how to use the vehicle 2 after the software update (so-called manual). The license information is an example of "data" (first data and second data) according to the present disclosure.

It is desirable to appropriately provide the license information to the user without impairing user convenience. Possible devices to display the license information are the in-vehicle display 27 and the user equipment 3. The in-vehicle display 27 such as an MID or an instrument panel typically has a larger screen than the user equipment 3 such as a smartphone or a wearable device. In addition, the angle of the in-vehicle display 27 is adjusted so that the user can see the in-vehicle display 27 while sitting in the vehicle cabin, and the visibility of the in-vehicle display 27 particularly from the driver's seat is very high. In other words, the in-vehicle display 27 would not require the user to move to the place where a notebook PC or desktop PC is located, and is also hands-free unlike smartphones and tablets. The in-vehicle display 27 is therefore considered to be a suitable device to display the license information.

In the case where the license information is displayed in the same way on the in-vehicle display 27 and the user equipment 3, such uniformity may lead to a reduction in user convenience. Therefore, the present embodiment uses a configuration in which the information granularity of the license information is varied between the in-vehicle display 27 and the user equipment 3. More specifically, the OTA center 1 makes the information granularity of the license information to be displayed on the in-vehicle display 27 higher than that of the license information to be displayed on the user equipment 3. High information granularity refers to various information elements being included in a set of information.

Figure 5:
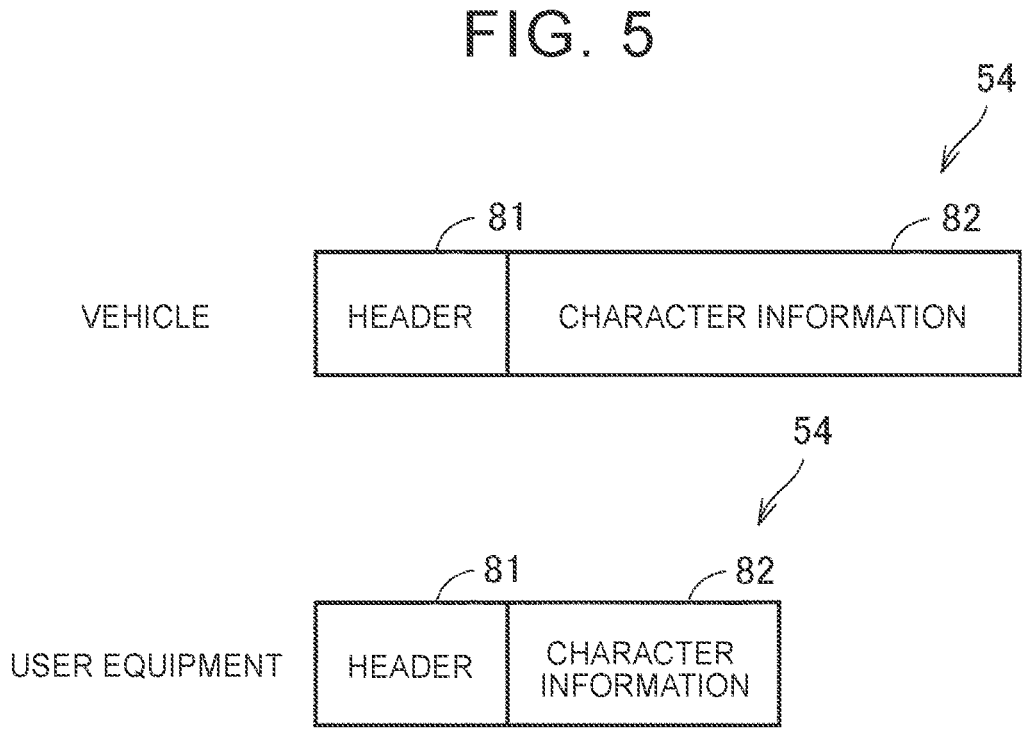
FIG. 5 shows an example of a data structure of license information according to the embodiment.
Figure 6:
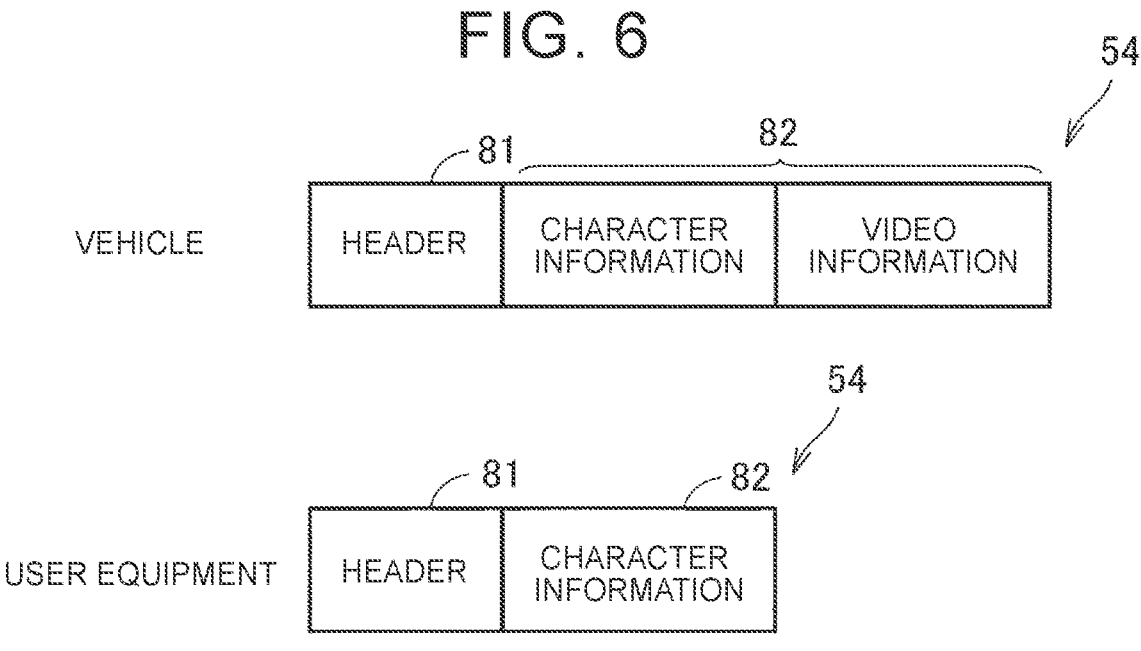
FIG. 6 shows another example of the data structure of the license information according to the embodiment.

FIG. 5 shows an example of a data structure of the license information 54 according to the present embodiment. FIG. 6 shows another example of the data structure of the license information 54 according to the present embodiment. The license information 54 (see FIG. 2) stored in the storage 113 of the server 11 includes a header (metadata) 81 and a body (data body) 82. The header 81 may include a data creator, creation date, title, tag, data type, data length, etc. The body 82 includes license information.

In the example shown in FIG. 5, the license information 54 includes character information for obtaining the user's approval to a software update. The amount of information (amount of description) in the character information to be displayed on the in-vehicle display 27 is greater than the amount of information in the character information to be displayed on the user equipment 3. As a specific example, the entire character information (e.g., items and detailed description of each item) is displayed on the in-vehicle display 27, while particularly important part of the character information (e.g., items only, or items and brief description of each item) are extracted and displayed on the user equipment 3. This is an example in which the information granularity of the license information 54 to be displayed on the in-vehicle display 27 is high.

In the example shown in FIG. 6, the license information 54 to be displayed on the in-vehicle display 27 includes video information in addition to the character information. The video information refers to an animation that visually explains the content of a software update, an animation that explains the procedure required for a software update (advance preparations, important notes, etc.), and a video manual on how to use the vehicle 2 after a software update. On the other hand, the license information 54 to be displayed on the user equipment 3 includes the character information, but does not include the video information. This is another example in which the information granularity of the license information 54 to be displayed on the in-vehicle display 27 is high.

As described above, in the present embodiment, the information granularity of the license information 54 to be displayed on the in-vehicle display 27 is higher than that of the license information 54 to be displayed on the user equipment 3. In other words, the amount and/or number of types of license information 54 to be displayed on the in-vehicle display 27 is greater than the amount and/or number of types of license information 54 to be displayed on the user equipment 3. The user can therefore give approval to the software update after carefully checking the license information 54 on the in-vehicle display 27 that is suitable for displaying the license information 54. User convenience can thus be improved.

Process Flow

Figure 7:
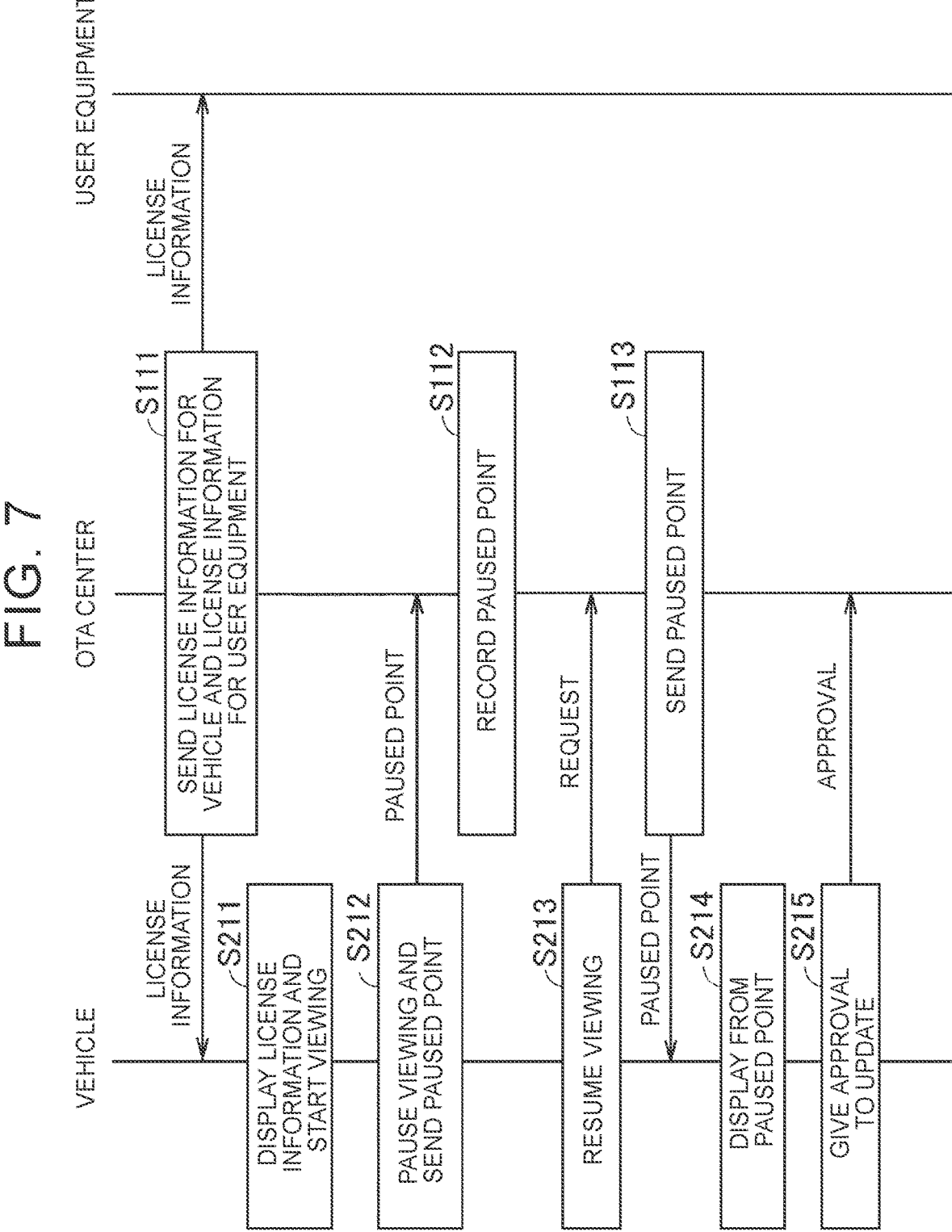
FIG. 7 is a flowchart showing a first example of a process of obtaining the user's approval to a software update.

FIG. 7 is a flowchart showing a first example of a process of obtaining the user's approval to a software update. The process shown in this flowchart is performed when a predetermined condition is satisfied (e.g., when software to be newly updated is registered in the OTA center 1). In the figure, the steps to be performed by the vehicle 2 are shown on the left side, the steps to be performed by the OTA center 1 are shown in the middle, and the steps to be performed by the user equipment 3 are shown on the right side. Hereinafter, the term "step" is abbreviated as "S."

First, the OTA center 1 sends license information to be displayed on the in-vehicle display 27 to the vehicle 2, and also sends license information to be displayed on the display 33 of the user equipment 3 to the user equipment 3 (S111). The OTA center 1 may send the license information to the vehicle 2 and the user equipment 3 either at different times or substantially at the same time. The OTA center 1 may send the license information to the vehicle 2 in response to a request from the vehicle 2, and may send the license information to the user equipment 3 in response to a request from the user equipment 3. As described above with reference to FIGS. 5 and 6, the information granularity of the license information to be displayed on the in-vehicle display 27 is higher than that of the license information to be displayed on the display 33 of the user equipment 3.

In this example, the user operates the input device 26 of the vehicle 2 to view the license information. In response to this operation, the ECU of the vehicle 2 (that may be either the central ECU 21 or the discrete ECU 22) causes the in-vehicle display 27 to display the license information (S211).

There are case where the viewing of the license information is paused for some reason, such as because something has come up to the user, before he or she performs an operation of giving approval to the software update. In such a case, the vehicle 2 sends the paused point of the license information (information indicating how far the license information has been viewed) to the OTA center 1 (S212). When the OTA center 1 receives the paused point of the license information, the OTA center 1 records the received paused point in the storage 113 (S112).

For example, the user resumes viewing the license information later when it is convenient for the user. In this example, it is assumed that the user resumes viewing the license information using the in-vehicle display 27. When the vehicle 2 receives a user operation of resuming the viewing, the vehicle 2 sends a request to resume the viewing to the OTA center 1 (S213). In response to the request from the vehicle 2, the OTA center 1 sends the paused point recorded in S112 to the vehicle 2 (S113). The vehicle 2 then causes the in-vehicle display 27 to display the license information from the paused point (S214).

When the vehicle 2 subsequently receives a user operation of giving approval to the software update, the vehicle 2 sends the user's approval to the OTA center 1 (S215). A series of processes for updating the software (download, installation, and activation described above), not shown, is then performed in the vehicle 2.

As described above, in the case where the user pauses the viewing of the license information and then resumes the viewing, the paused point of the license information may be taken over. With this configuration, the user does not have to re-view the part of the license information he or she has already viewed before pausing the viewing. Therefore, user convenience can further be improved.

Figure 8:
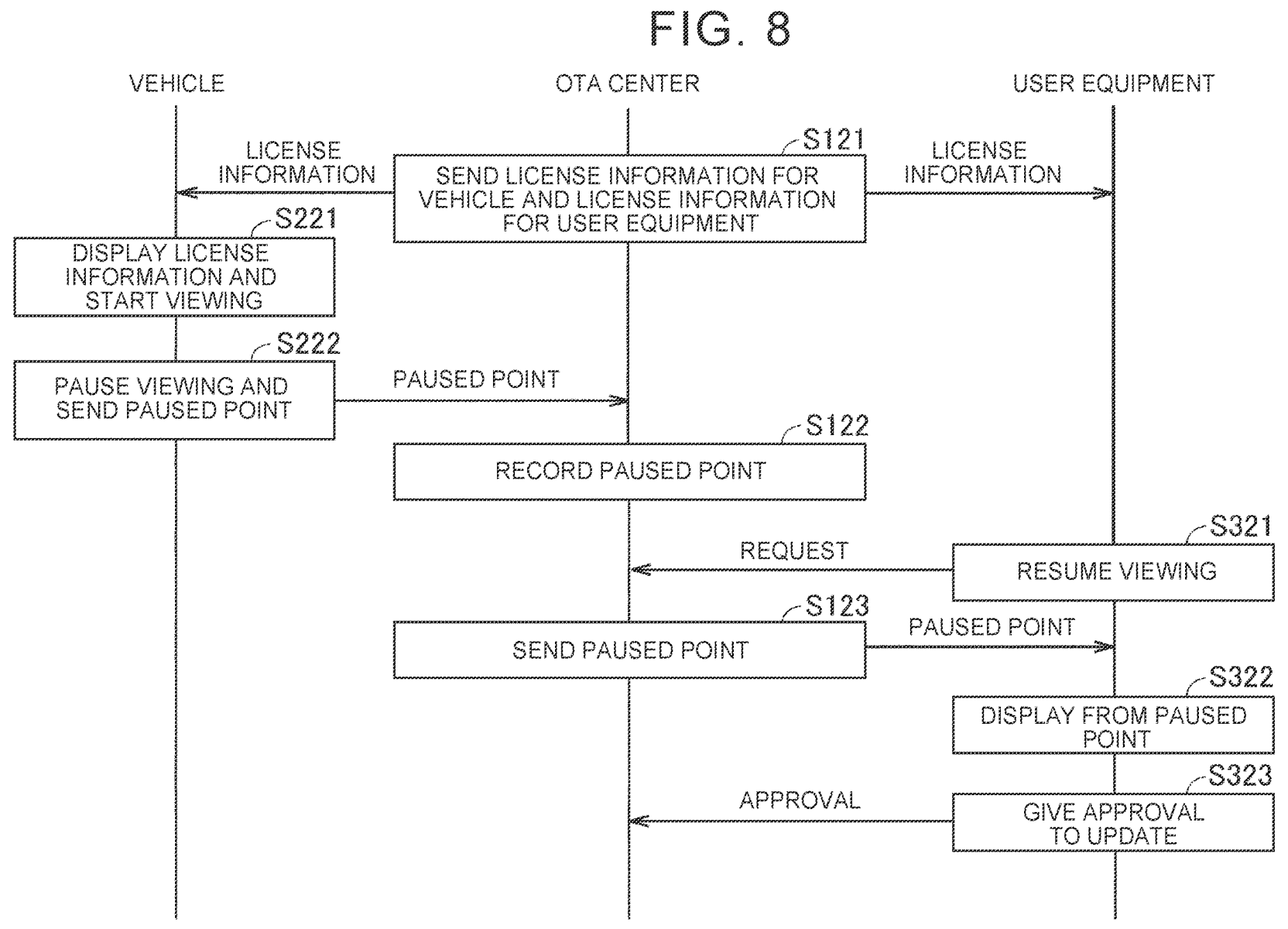

FIG. 8 is a flowchart showing a second example of the process of obtaining the user's approval to a software update. In this example, it is assumed that the user pauses the viewing of the license information on the vehicle 2 (in-vehicle display 27) and then resumes viewing the license information using the user equipment 3. The steps up to S122 are the same as the corresponding steps in FIG. 7.

When the user equipment 3 receives a user operation of resuming the viewing, the user equipment 3 sends a request to resume the viewing to the OTA center 1 (S321). In response to the request from the user equipment 3, the OTA center 1 sends the paused point recorded in S122 to the user equipment 3 (S123). The user equipment 3 displays the license information from the paused point on the display 33 (S322). When the user equipment 3 subsequently receives a user operation of giving approval to the software update, the user equipment 3 sends the user's approval to the OTA center 1 (S323).

Figure 9:
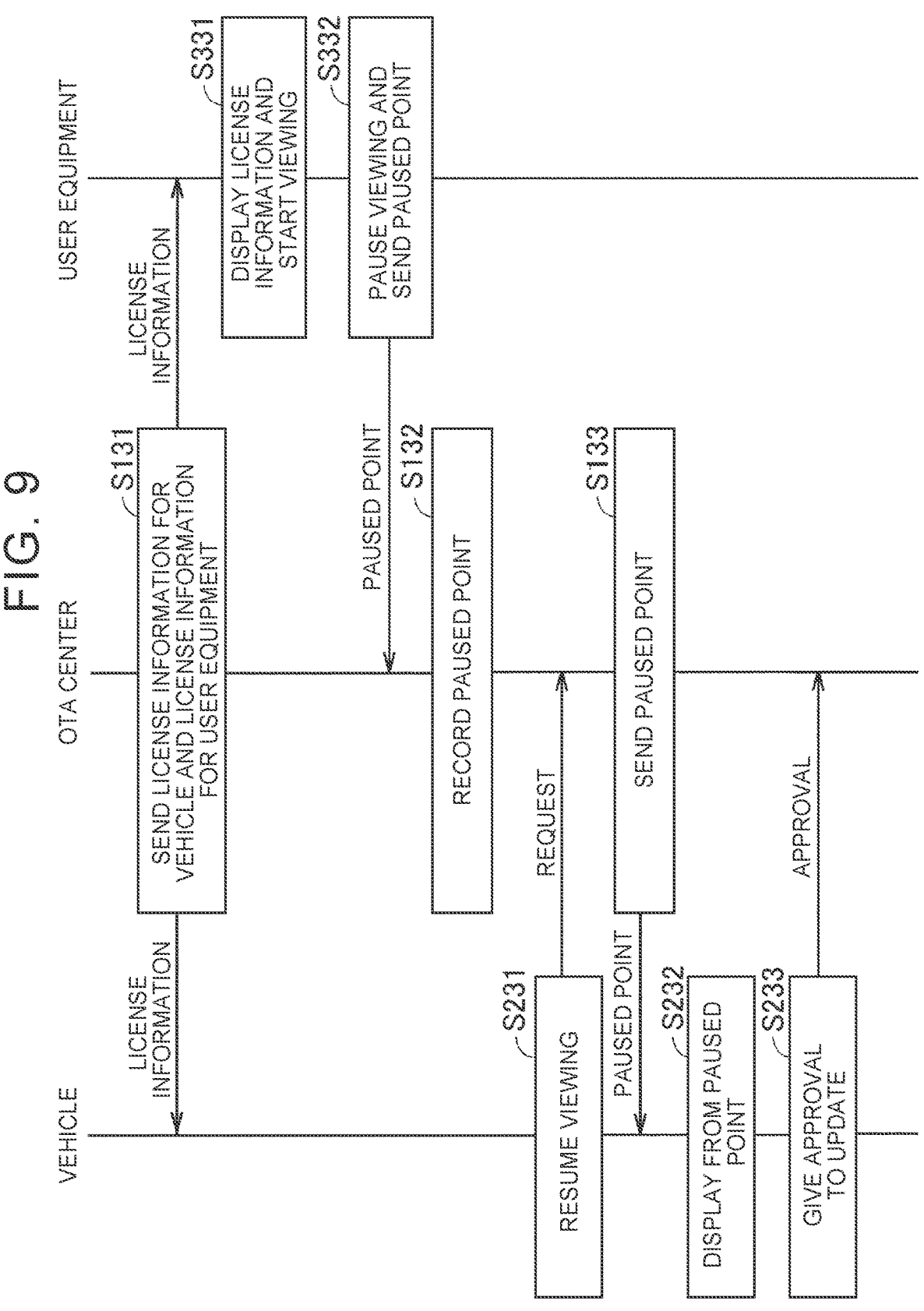
FIG. 9 is a flowchart showing a third example of the process of obtaining the user's approval to a software update.

FIG. 9 is a flowchart showing a third example of the process of obtaining the user's approval to a software update. Although detailed description will not be repeated, the user equipment 3 and the vehicle 2 may be used in the opposite order to that shown in FIG. 8. Namely, as shown in FIG. 9, the license information may first be viewed on the user equipment 3, and the viewing of the license information may then be taken over by the vehicle 2.

As described above, in the case where the user pauses the viewing of the license information and then resumes the viewing, the paused point of the license information may be taken over even if the device used to view the license information is changed before and after the pause (in other words, regardless of whether the license information is viewed using the vehicle 2 or the user equipment 3). With this configuration, as in the example of FIG. 7, the user does not have to re-view the part of the license information he or she has already viewed before pausing the viewing. Therefore, user convenience can further be improved.

Figure 10:
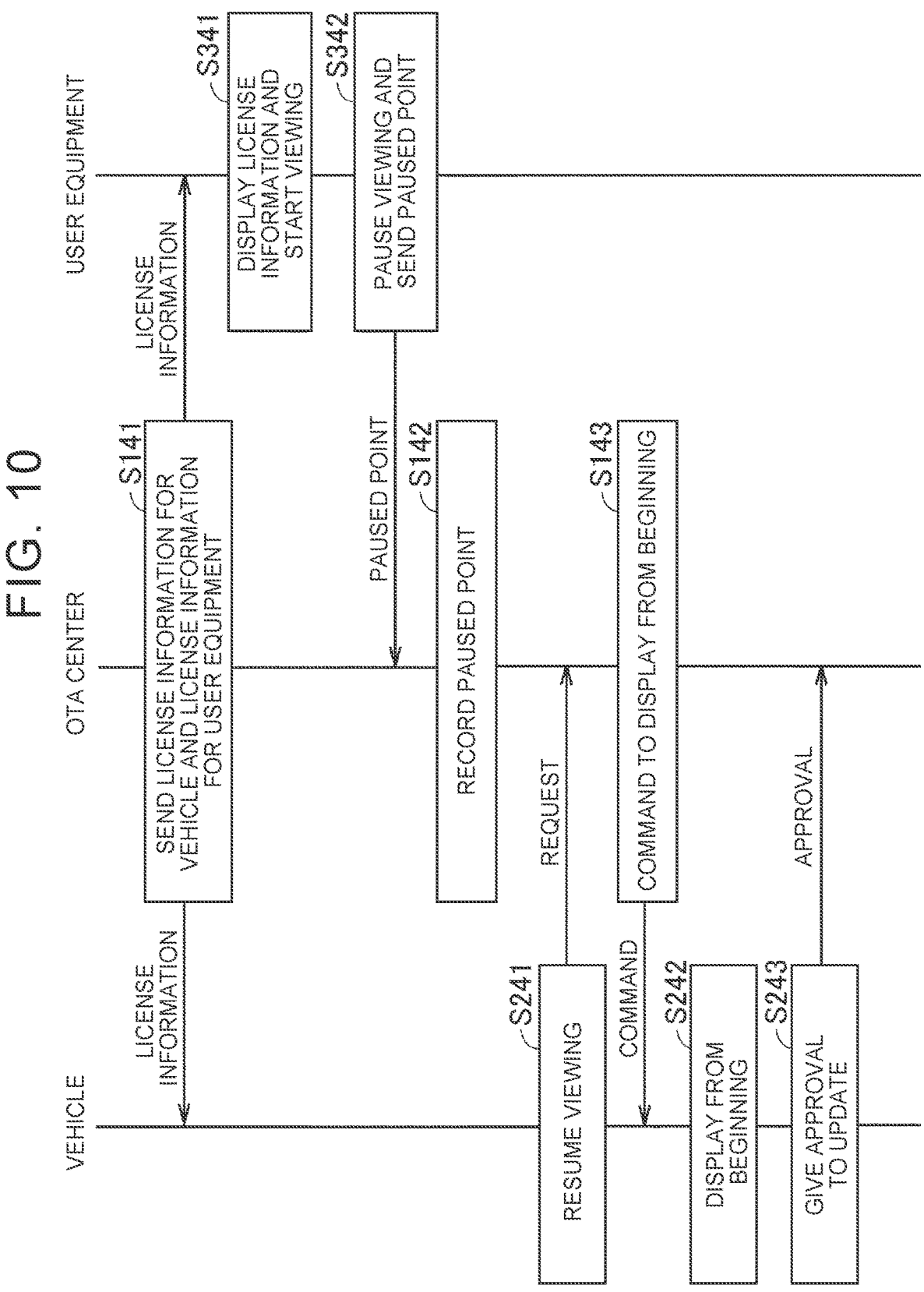
FIG. 10 is a flowchart showing a fourth example of the process of obtaining the user's approval to a software update.

FIG. 10 is a flowchart showing a fourth example of the process of obtaining the user's approval to a software update. In FIG. 10 as well, when the viewing of the license information is paused on the user equipment 3, the paused point is recorded by the OTA center 1 (S142), as in the example of FIG. 9. The user then resumes viewing the license information using the vehicle 2 (in-vehicle display 27). When the vehicle 2 receives a user operation of resuming the viewing, the vehicle 2 sends a request to resume the viewing to the OTA center 1 (S241). The OTA center 1 receives the request from the vehicle 2.

In this example, although the paused point is recorded in S142, the OTA center 1 sends to the vehicle 2 a command to display the license information from the beginning (S143). The vehicle 2 causes the in-vehicle display 27 to display the license information from the beginning according to the command (S242). When the vehicle 2 subsequently receives a user operation of giving approval to the software update, the vehicle 2 sends the user's approval to the OTA center 1 (S243).

As described above, in the case where the user pauses the viewing of the license information on the user equipment 3 and then resumes the viewing using the vehicle 2, the OTA center 1 may display the entire license information from the beginning on the in-vehicle display 27. This allows the user to view the entire license information using the in-vehicle display 27 that has high visibility inside the vehicle cabin (more specifically, that has a large screen, is adjusted to an easy-to-see angle, and is hands-free). The user can therefore carefully and efficiently view the license information.

As described above, in the present embodiment, the information granularity of the license information is set so that the license information is displayed in a display mode suitable for the device in consideration of the location and/or visibility of each device. More specifically, the information granularity of the license information to be displayed on the in-vehicle display 27 is set to be higher than that of the license information to be displayed on the user equipment 3. Accordingly, when the user uses the in-vehicle display 27, the user can give approval to the software update after carefully checking the license information. On the other hand, when the user uses the user equipment 3, the user can give approval to the software update after quickly checking the license information. According to the present embodiment, user convenience can therefore be improved.

The embodiment disclosed herein should be construed as illustrative in all respects and not restrictive. The scope of the present disclosure is shown by the claims rather than by the above description of the embodiment and is intended to include all modifications within the meaning and scope equivalent to the claims.

A server according to a first aspect of the present disclosure sends data for updating software on a vehicle control device through wireless communication. The server includes a memory storing a program, and a processor configured to execute the program. The processor is configured to set first data and second data, the first data being data to be displayed on an in-vehicle display in order to obtain user's approval to the software update, and the second data being data to be displayed on user equipment in order to obtain the user's approval to the software update. The first data has higher information granularity than the second data.

In the above aspect, an amount of information in character information included in the first data may be greater than an amount of information in character information included in the second data.

In the above aspect, the first data may include video information, and the second data may not include the video information.

In the above aspect, the processor may be configured to, when the user views part way through the first data using the in-vehicle display and then further views the second data using the user equipment, cause the user equipment to display, as the second data, information following information that is included in the first data and that has already been viewed using the in-vehicle display.

In the above aspect, the processor may be configured to, when the user views part way through the second data using the user equipment and then further views the first data using the in-vehicle display, cause the in-vehicle display to display, as the first data, information following information that is included in the second data and that has already been viewed using the user equipment.

In the above aspect, the processor may be configured to, when the user views part way through the second data using the user equipment and then further views the first data using the in-vehicle display, cause the in-vehicle display to display the first data including information that is included the second data and the user has already viewed using the user equipment.

A non-transitory storage medium according to a second aspect of the present disclosure stores instructions that are executable by a computer and that cause the computer to perform functions in order to update software on a vehicle control device through wireless communication. The functions include: setting first data and second data, the first data being data to be displayed on an in-vehicle display in order to obtain user's approval to the software update, and the second data being data to be displayed on user equipment in order to obtain the user's approval to the software update; and causing either or both of the in-vehicle display and the user equipment to display corresponding data out of the first data and the second data. The first data has higher information granularity than the second data.

A software update method according to a third aspect of the present disclosure is a method for updating software on a vehicle control device through wireless communication. The software update method includes: setting first data and second data, the first data being data to be displayed on an in-vehicle display in order to obtain user's approval to the software update, and the second data being data to be displayed on user equipment in order to obtain the user's approval to the software update; and causing either or both of the in-vehicle display and the user equipment to display corresponding data out of the first data and the second data. The first data has higher information granularity than the second data.

What is claimed is:

1. A server configured to send data for updating software on a vehicle control device through wireless communication, the server comprising:
    a memory storing a program; and
    a processor configured to execute the program, the processor being configured to set first data and second data, the first data being data to be displayed on an in-vehicle display in order to obtain user's approval of a software license related to a software update and license information of the software license for approval by the user, the second data being data to be displayed on user equipment in order to obtain the user's approval of the software license related to the software update and license information of the software license for approval by the user, and the first data having higher information granularity than the second data;
    wherein the processor is further configured to:
    transmit the first data to the vehicle mounted with the in-vehicle display, and
    transmit the second data to the user equipment that is different from the in-vehicle display.

2. The server according to claim 1, wherein an amount of information in character information included in the first data is greater than an amount of information in character information included in the second data.

3. The server according to claim 1, wherein:
    the first data includes video information; and
    the second data does not include the video information.

4. The server according to claim 1, wherein the processor is configured to, when the user views part way through the first data using the in-vehicle display and then further views the second data using the user equipment, cause the user equipment to display, as the second data, information following information that is included in the first data and that has already been viewed using the in-vehicle display.

5. The server according to claim 1, wherein the processor is configured to, when the user views part way through the second data using the user equipment and then further views the first data using the in-vehicle display, cause the in-vehicle display to display, as the first data, information that follows information that is included in the second data and that has already been viewed using the user equipment.

6. The server according to claim 1, wherein the processor is configured to, when the user views part way through the second data using the user equipment and then further views the first data using the in-vehicle display, cause the in-vehicle display to display the first data including information that is included in the second data and that the user has already viewed using the user equipment.

7. A non-transitory storage medium storing instructions that are executable by a computer and that cause the computer to perform functions for updating software on a vehicle control device through wireless communication, the functions comprising:
    setting first data and second data, the first data being data to be displayed on an in-vehicle display in order to obtain user's approval of a software license related to a software update and license information of the software license for approval by the user, and the second data being data to be displayed on user equipment in order to obtain the user's approval of the software license related to the software update and license information of the software license for approval by the user;
    causing either or both of the in-vehicle display and the user equipment to display corresponding data out of the first data and the second data, the first data having higher information granularity than the second data;
    transmitting the first data to the vehicle mounted with the in-vehicle display, and
    transmitting the second data to the user equipment that is different from the in-vehicle display.

8. A software update method for updating software on a vehicle control device through wireless communication, the software update method comprising:

setting first data and second data, the first data being data to be displayed on an in-vehicle display in order to obtain user's approval of a software license related to a software update and license information of the software license for approval by the user, and the second data being data to be displayed on user equipment in order to obtain the user's approval of the software license related to the software update and license information of the software license for approval by the user;

causing either or both of the in-vehicle display and the user equipment to display corresponding data out of the first data and the second data, the first data having higher information granularity than the second data;

transmitting the first data to the vehicle mounted with the in-vehicle display, and transmitting the second data to the user equipment that is different from the in-vehicle display.

\* \* \* \* \*